(12) United States Patent
Lawrence

(10) Patent No.: US 12,178,213 B2
(45) Date of Patent: Dec. 31, 2024

(54) MULTI-CONVEYOR TRANSFER SYSTEM

(71) Applicant: Lawrence Equipment, Inc., South El Monte, CA (US)

(72) Inventor: Eric Clay Lawrence, Hungtington Beach, CA (US)

(73) Assignee: Lawrence Equipment, Inc., South El Monte, CA (US)

(*) Notice: Subject to any disclaimer, the term of this patent is extended or adjusted under 35 U.S.C. 154(b) by 207 days.

(21) Appl. No.: 18/082,816

(22) Filed: Dec. 16, 2022

(65) Prior Publication Data

US 2024/0196910 A1 Jun. 20, 2024

(51) Int. Cl.
*A21C 9/08* (2006.01)
*A21C 11/00* (2006.01)
(Continued)

(52) U.S. Cl.
CPC .......... *A21C 9/08* (2013.01); *A21C 11/00* (2013.01); *B65G 47/53* (2013.01); *B65G 47/68* (2013.01);
(Continued)

(58) Field of Classification Search
CPC ...... B65G 2203/042; B65G 2201/0202; B65G 47/68; B65G 47/96; B65G 47/967;
(Continued)

(56) References Cited

U.S. PATENT DOCUMENTS 2,901,090 A 8/1959 Augusto
3,953,613 A 4/1976 Morgenthaler et al.
(Continued)

FOREIGN PATENT DOCUMENTS

DE 10107998 7/2002
EP 1177722 2/2002
(Continued)

OTHER PUBLICATIONS

International Search Report and Written Opinion in International Appln. No. PCT/US23/77160, mailed on Feb. 21, 2024, 7 pages.
(Continued)

*Primary Examiner* — James R Bidwell
(74) *Attorney, Agent, or Firm* — Fish & Richardson P.C.

(57) ABSTRACT

Methods, systems, and apparatus, including programs encoded on computer storage media, for transferring comestibles between conveyors. An exemplary method includes receiving, by a first conveyor of a conveyor system, a first comestible; transferring, by the first conveyor at a respective upper comestible transfer position, the first comestible to a subsequent conveyor of the conveyor system; receiving, by the first conveyor at the respective upper comestible transfer position, a second comestible; receiving, by a last conveyor of the conveyor system at a respective upper comestible transfer position, a third comestible; and moving, substantially concurrently, at least part of the first conveyor and at least part of the last conveyor from the respective upper comestible transfer positions to respective comestible discharge positions at which the respective conveyor transfers the respective comestible onto a corresponding location on a lower conveyor positioned at least in part below the conveyor system in a vertical direction.

21 Claims, 5 Drawing Sheets

(51) Int. Cl.
  *B65G 47/53* (2006.01)
  *B65G 47/68* (2006.01)
(52) U.S. Cl.
  CPC .............. *B65G 2201/0202* (2013.01); *B65G 2203/042* (2013.01)
(58) Field of Classification Search
  CPC ........... B65G 47/53; A21C 9/08; A21C 1/006; A21C 11/00
  USPC ...................................................... 198/418.6
  See application file for complete search history.

(56) References Cited

U.S. PATENT DOCUMENTS

| | | | |
|---|---|---|---|
| 3,993,422 A | | 11/1976 | Riviere et al. |
| 4,318,678 A | | 3/1982 | Hayashi et al. |
| 4,635,786 A | * | 1/1987 | Renda .................... B65G 47/78 198/418.6 |
| 4,668,524 A | | 5/1987 | Kirkpatrick |
| 4,703,679 A | | 11/1987 | Hayashi |
| 4,741,263 A | | 5/1988 | Ueno et al. |
| 4,905,581 A | | 3/1990 | Kirkpatrick |
| 4,905,583 A | | 3/1990 | Hayashi |
| 4,938,126 A | | 7/1990 | Rubio |
| 4,940,129 A | | 7/1990 | Walz |
| 4,996,915 A | | 3/1991 | Morikawa |
| 5,018,439 A | | 5/1991 | Bordin |
| 5,088,391 A | | 2/1992 | Anderson |
| 5,231,919 A | | 8/1993 | Lawrence |
| 5,341,913 A | * | 8/1994 | Francioni ................ B65B 23/14 198/435 |
| 5,388,503 A | | 2/1995 | Buerkle |
| 5,427,226 A | * | 6/1995 | Ueda .................... B65G 47/082 198/732 |
| 5,501,140 A | | 3/1996 | Balleza et al. |
| 5,931,086 A | * | 8/1999 | Kennedy ................ A23G 9/286 425/207 |
| 6,098,782 A | | 8/2000 | Hardage et al. |
| 6,263,789 B1 | | 7/2001 | Karner |
| 7,097,026 B2 | | 8/2006 | Lawrence |
| 7,448,313 B2 | | 11/2008 | Lawrence |
| 8,517,164 B2 | | 8/2013 | Zampollo |
| 2008/0073178 A1 | | 3/2008 | Lawrence |

FOREIGN PATENT DOCUMENTS

| | | | |
|---|---|---|---|
| GB | 912637 | | 12/1962 |
| WO | WO-2019176288 A1 | * | 9/2019 .............. B65G 43/08 |

OTHER PUBLICATIONS

International Preliminary Report on Patentability in International Appln. No. PCT/US2004/33343, dated Apr. 10, 2006, 4 pages.
International Search Report and Written Opinion in International Appln. No. PCT/US2004/33343, mailed on Feb. 10, 2005, 6 pages.
Supplementary European Search Report in European Appln. No. 04794640.5, dated Nov. 18, 2008, 3 pages.

* cited by examiner

MULTI-CONVEYOR TRANSFER SYSTEM

BACKGROUND

Examples of comestible products are flatbreads or wraps, which include, for example, tortillas, pita bread, pizza crusts, chapatti, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, and pressing of flatbread dough.

Factories can include different types of tools or equipment for the different stages in the production process, such as a mixer, a sheeter or forming press, and an oven. Some production lines have tools to form flatbread dough into a ball and other tools to flatten the dough for baking. The flattened dough can have a circular shape and a specific thickness so the flatbread will have a desired thickness after baking.

SUMMARY

In general, one aspect of the subject matter described in this specification can be embodied in a system that includes a conveyor subsystem adapted to move a plurality of comestibles in a longitudinal direction and onto a lower conveyor positioned at least in part below the conveyor subsystem in a vertical direction. The conveyor subsystem including a first conveyor adapted to move from a first upper comestible transfer position at which the first conveyor receives comestibles and transfers at least some of the comestibles to a subsequent conveyor to a first comestible discharge position at which the first conveyor places at least some of the comestibles onto a first location on the lower conveyor. The conveyor subsystem including a last conveyor spaced apart longitudinally from the first conveyor and adapted to move from a last upper comestible transfer position at which the last conveyor receives second comestibles to a last comestible discharge position at which the last conveyor places the second comestibles onto a last location on the lower conveyor that is separated from the first location in the longitudinal direction.

In some implementations, the first conveyor is adapted to move from the first upper comestible transfer position to the first comestible discharge position when a first comestible approaches a first downstream edge of the first conveyor. The last conveyor is adapted to move from the last upper comestible transfer position to the last comestible discharge position when a last comestible approaches a last downstream edge of the last conveyor.

In some implementations, for the first conveyor, the first comestible discharge position is a position at which the first conveyor places at least some of the comestibles onto the first location on the lower conveyor and does not transfer any comestibles to the subsequent conveyor. In some implementations, the conveyor subsystem includes two or more actuators each of which is coupled to a corresponding conveyor and adapted to move at least a portion of the corresponding conveyor from an upper comestible transfer position to a comestible discharge position.

In some implementations, a last actuator from the two or more actuators is adapted to rotate the entire last conveyor from the last upper comestible transfer position to the last comestible discharge position. In some implementations, the two or more actuators include a first actuator coupled to the first conveyor and two or more second actuators coupled to respective conveyors, the respective conveyors including the subsequent conveyor and the last conveyor, and each of the two or more second actuators is adapted to rotate, substantially concurrently, the respective conveyor from a respective receiving position to a respective discharge position.

In some implementations, the first actuator is adapted to rotate a moveable portion of the first conveyor substantially concurrently with the rotation of the respective conveyors by the corresponding ones of the two or more second actuators.

In some implementations, the subsequent conveyor is separate from the last conveyor and has substantially the same shape as the last conveyor. In some implementations, the first conveyor includes a substantially fixed portion adapted to receive a comestible from a prior transfer device, and a moveable portion downstream longitudinally from the substantially fixed portion adapted to rotate and place a comestible onto the lower conveyor.

In some implementations, the substantially fixed portion is substantially horizontal. The lower conveyor is adapted to receive comestibles separated longitudinally from the first conveyor and the last conveyor.

In some implementations, the system includes a support frame that couples to the conveyor subsystem and the lower conveyor, and includes a press coupled to the support frame, downstream longitudinally from the conveyor subsystem, and that is adapted to press comestibles positioned on the lower conveyor after the conveyor subsystem moves the comestibles onto the lower conveyor.

In general, one aspect of the subject matter described in this specification can be embodied in methods that include the actions of receiving, by a first conveyor of a conveyor system, a first comestible, transferring, by the first conveyor at a respective upper comestible transfer position, the first comestible to a subsequent conveyor of the conveyor system, receiving, by the first conveyor at the respective upper comestible transfer position, a second comestible, receiving, by a last conveyor of the conveyor system at a respective upper comestible transfer position, a third comestible, and moving, substantially concurrently, at least part of the first conveyor and at least part of the last conveyor from the respective upper comestible transfer positions to respective comestible discharge positions at which the respective conveyor transfers the respective comestible onto a corresponding location on a lower conveyor positioned at least in part below the conveyor system in a vertical direction.

In some implementations, moving the first conveyor and the last conveyor includes rotating, using one or more actuators, the first conveyor and the last conveyor from the respective upper comestible transfer positions to the respective comestible discharge positions. In some implementations, the method further includes determining, for each discharging conveyor in the conveyor system, whether the respective discharging conveyor has at least one comestible on an upper surface, wherein the discharging conveyors comprise at least the first conveyor and the last conveyor, and in response to determining that at least one discharging conveyor in the conveyor system does not have at least one comestible on an upper surface, transferring, by one or more of the discharging conveyors, comestibles to subsequent discharging conveyors.

In some implementations, determining whether the respective discharging conveyor has at least one comestible on an upper surface uses a sensor. In some implementations, moving at least part of the first conveyor and at least part of the last conveyor includes: determining, for each discharging conveyor in the conveyor system, whether the respective discharging conveyor has at least one comestible on an upper surface, wherein the discharging conveyors comprise at least the first conveyor and the last conveyor; and in response to determining that each of the discharging conveyors in the conveyor system have at least one comestible on an upper surface, moving, substantially concurrently, at least part of each of the discharging conveyors from a respective upper comestible transfer position to a respective comestible discharge position at which the respective discharging conveyor places a respective comestible onto a corresponding location on the lower conveyor.

In some implementations, determining whether the respective discharging conveyor has at least one comestible on an upper surface includes determining whether a time period has expired.

In some implementations, the method includes moving, by the lower conveyor, one or more comestibles received from the conveyor system to corresponding locations in a press, and pressing, by the press, the one or more comestibles to form one or more corresponding flattened comestibles. In some implementations, the method includes maintaining the lower conveyor in a stopped position while the press presses the one or more comestibles to form the one or more flattened comestibles, moving the lower conveyor to move the flattened comestibles downstream from the press, and substantially concurrently with moving the lower conveyor to move the flattened comestibles downstream from the press, transferring, using at least the first conveyor and the last conveyor in respective comestible discharge positions, the second comestible and the third comestible to the lower conveyor.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

The subject matter described in this specification can be implemented in various implementations and may result in one or more of the following advantages. In some implementations, the use of a multi-conveyor transfer system can enable a system to process comestibles more accurately compared to other systems, e.g., by more accurately placing the comestibles at target positions in a downstream component. In some implementations, the use of a multi-conveyor transfer system can enable a system to process a wider variety of comestible types, e.g., both gluten and gluten free comestibles, because the multi-conveyor transfer system has fewer components onto which gluten free comestibles can stick compared to other systems. In some implementations, the use of a multi-conveyor transfer system can enable a system to move comestibles through a conveyor system while one of the conveyors periodically stops, e.g., as part of comestible processing.

In some implementations, the use of a multi-conveyor transfer system can result in increased speed of the production process, namely, by feeding a continuous array of hockey puck-shaped comestibles from a feeding device, such as an extruder, a sheeter, or one or more pumps with the nozzles removed or cut off, to an intermittent press without the need for the comestibles to be stopped when the press is stopped during, for example, press forming. This allows the process to continue without stopping of the infeed device of the press. Separately, as a result of the method which enables the feed device to run continuously, the press operation needs less time to complete the press formation, thus yielding increased production rates for this method compared to previous methods. For example, generally, a divider/proofer, auto-loading system, and press has a processing delay that cannot be completely removed because comestibles, such as dough balls, descend from one to four trays from up to 10 baskets down tubes with differing lengths and angles so the comestibles do not arrive at the same time. This obstacle to high speed processing is removed from the process with the multi-conveyor loading and transfer system of the present disclosure. In some implementations, the use of a multi-conveyor transfer system can result in the hockey puck-shaped comestibles arriving from their feeding device and being concurrently loaded in a predictable manner.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some comestible processing systems can transfer comestibles from one processing system or conveyor to another processing subsystem or conveyor. Sometimes this transfer process might not accurately place the comestibles in the correct position for future processing. For instance, when un-pressed dough is placed on a conveyor that feeds into a pressing system, the locations of the un-pressed dough balls on the conveyor can affect the accuracy of the pressing system in forming pressed dough balls. If some of the un-pressed dough balls are not at the correct location, those dough balls or other dough balls might not be par-baked correctly, might not be pressed correctly, or both. When a dough ball is not pressed correctly, it might not have a substantially uniform shape.

To improve an accuracy of a comestible processing system in positioning comestibles onto or in a downstream processing subsystem or conveyor, the comestible processing system can use a multi-conveyor transfer subsystem. The multi-conveyor transfer subsystem can include multiple conveyors spaced apart in a longitudinal direction in which comestibles are transferred. Each of the conveyors can include a moveable portion that moves from an upper comestible transfer position at which the conveyor receives a comestible to a comestible discharge position at which the conveyor places the comestible onto a single lower conveyor that receives the comestibles from each of the conveyors.

By using multiple conveyors to place the comestibles onto the single lower conveyor, the comestible processing system can more accurately place comestibles onto the single lower conveyor. This can improve downstream processing of the comestibles by various downstream components, such as a press.

In some examples, this can enable the comestible processing system to process a wider variety of comestibles than other systems. For instance, by using a multi-conveyor transfer subsystem, the comestible processing system can process both gluten free and gluten comestibles compared to other systems that could only accurately process gluten comestibles because the adhesion or stickiness of gluten free comestibles would cause the gluten free comestibles to stick to various portions of transfer components of the other systems. One example of gluten free comestibles includes corn dough used to make corn tortillas.

Figure 1A:
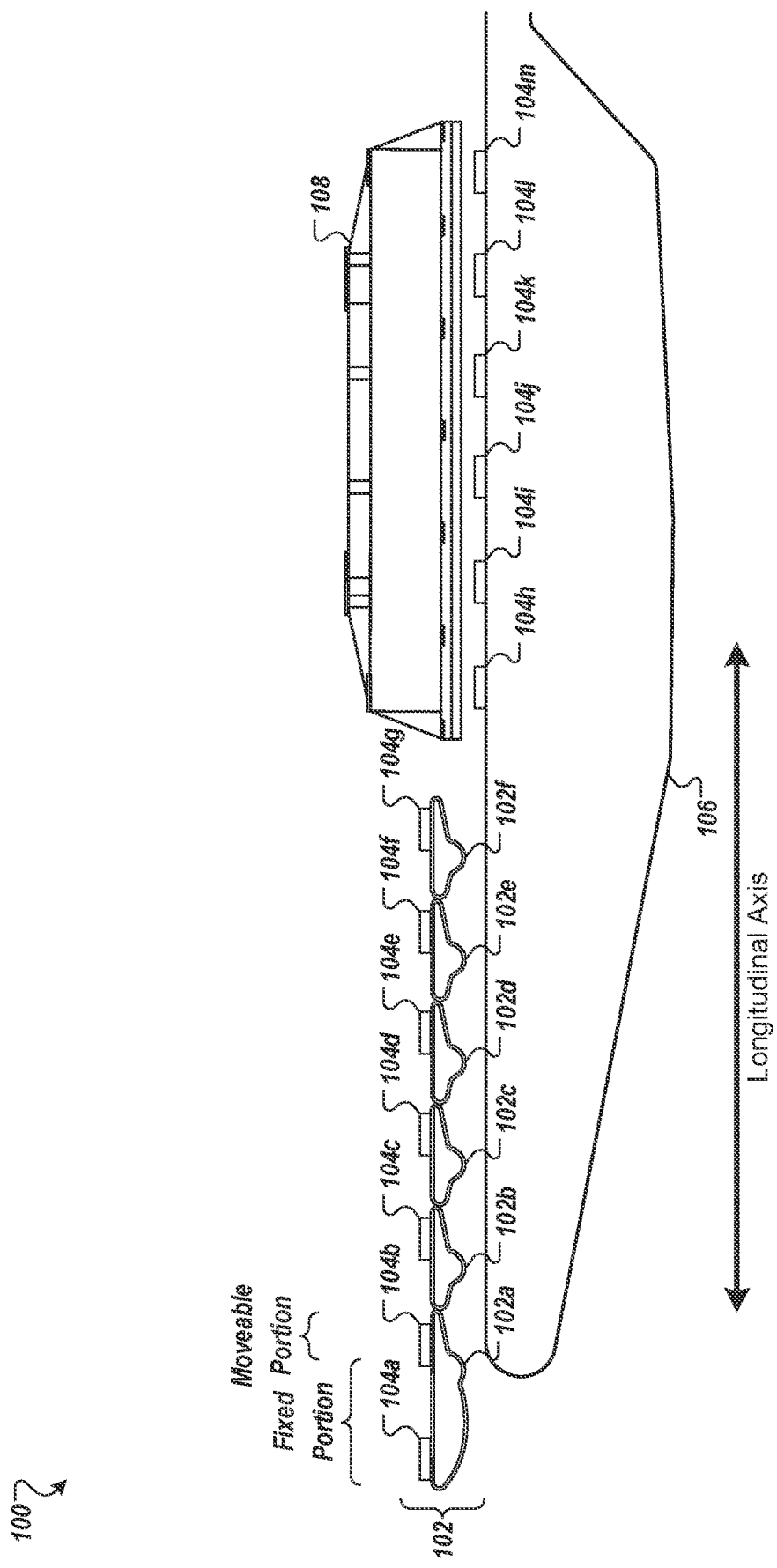
FIGS. 1A-C depict an example of a comestible processing system.
Figure 1B:
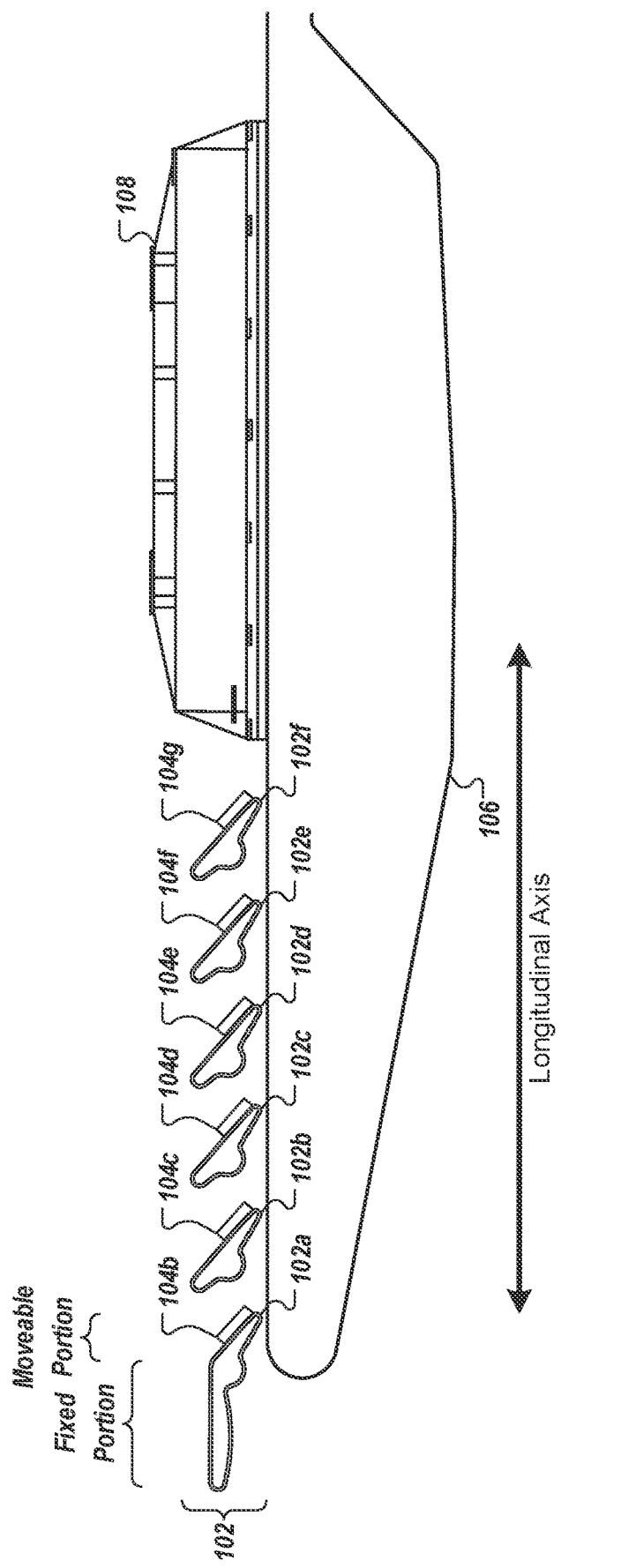
Figure 1C:
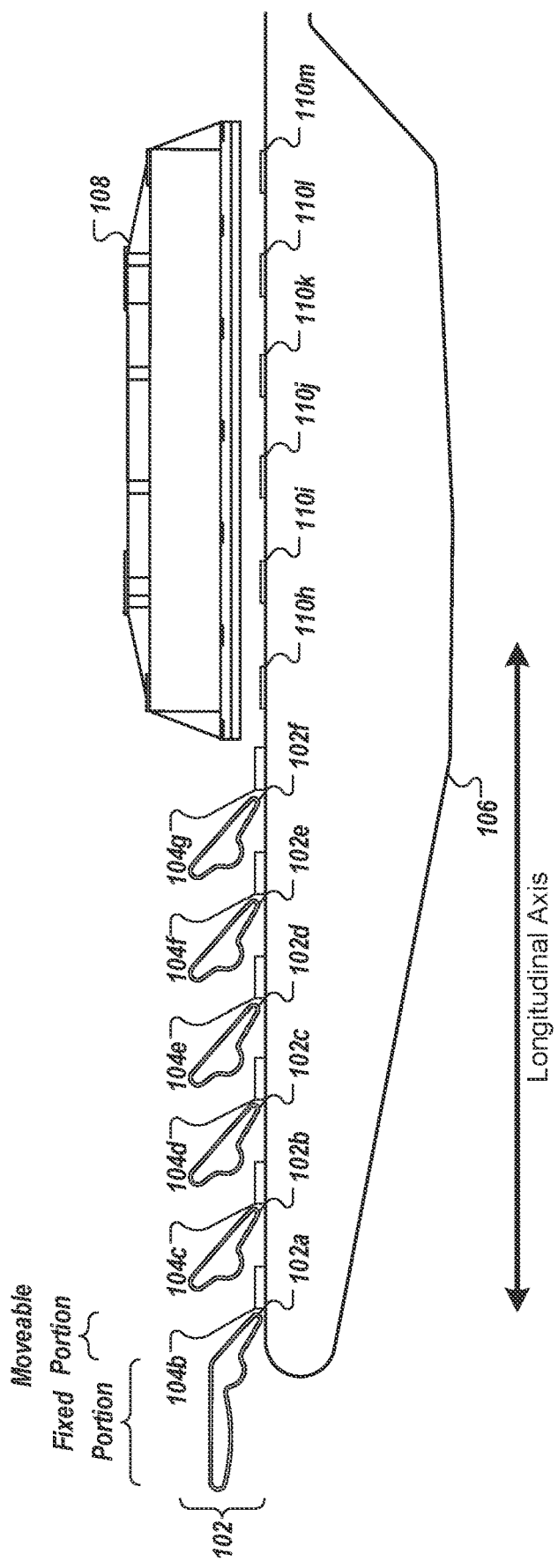

FIGS. 1A-C depict an example of a comestible processing system 100. The comestible processing system 100 can include more or fewer components, e.g., as described in more detail below. In FIGS. 1A-C, the comestible processing system 100 includes a multi-conveyor transfer subsystem 102. The multi-conveyor transfer subsystem 102 includes multiple separate conveyors 102a-f that are separated along a longitudinal axis L. The conveyors 102a-f are adapted to transfer one or more comestibles 104a-m from the multi-conveyor transfer subsystem 102 to a lower conveyor 106 in the comestible processing system 100.

For example, the comestible processing system 100 can process a pattern of comestibles 104a-m. The pattern can be any appropriate pattern, such as 3×3, 4×4, 5×5, 5×6, or 6×6, to name a few examples. The pattern can indicate a number of comestibles processed in a press 108, including in the comestible processing system 100, at the same time, e.g., assuming that there is a comestible at each location in the pattern and there isn't any missing comestibles. When the pattern is 5×5 or 5×6, each conveyor in the multi-conveyor transfer subsystem 102 can transfer five comestibles onto the lower conveyor 106 substantially concurrently. The five comestibles can be approximately aligned in a latitudinal direction.

By processing multiple comestibles at the same time, the comestible processing system 100 can be more efficient than other systems. For instance, instead of pressing a single comestible at a time, the press 108 can process multiple comestibles, increasing throughput in the comestible processing system 100.

As the comestible processing system 100 processes more comestibles at a time, an accuracy of placement of the comestibles in the comestible processing system 100 can affect the output comestibles. For example, if any of the comestibles are not properly aligned with corresponding target positions, some of the comestibles can be baked longer than other comestibles, baked less than other comestibles, have an irregular shape, have another non-conformity for a target comestible appearance, or a combination of two or more of these.

To improve an accuracy of the transfer of the comestibles 104a-m from an upper conveyor, e.g., prior to the multi-conveyor transfer subsystem 102, and onto the lower conveyor 106, a system can use the multi-conveyor transfer subsystem 102. The multi-conveyor transfer subsystem 102 can transfer groups of comestibles from the upper conveyor to the lower conveyor 106. For instance, the multi-conveyor transfer subsystem 102 can transfer the comestibles 104h-m from the upper conveyor to the lower conveyor 106, and then transfer the comestibles 104b-g from the upper conveyor to the lower conveyor 106.

As shown in FIG. 1A, the multi-conveyor transfer subsystem 102 transferred a group of multiple comestibles that include the comestibles 104h-m onto the lower conveyor 106. The comestibles can be any appropriate type of comestibles, e.g., dough balls. The comestibles can be formed of any appropriate type of material, e.g., gluten or gluten free dough.

In some implementations, given the adhesion of gluten free dough, by using the multi-conveyor transfer subsystem 102, a system can reduce a likelihood that the comestibles 104a-m will stick to portions of the system. For instance, gluten free dough can more readily adhere to metal or chute. By using the multi-conveyor transfer subsystem 102, the system can reduce a likelihood that the comestibles 104a-m will adhere to a component of the system.

The conveyors 102a-f in the multi-conveyor transfer subsystem 102 can be manufactured from any appropriate material. For instance, each of the conveyors can be manufactured from Teflon or another material with a low adhesion.

The comestibles 104a-m can be formed using any appropriate process. For instance, the comestibles 104a-m can be cut from a sheet of dough, formed by a former, or formed using another appropriate subsystem or process. In some examples, when the comestibles 104a-m are gluten comestibles, the comestibles 104a-m can be formed using a former. When the comestibles 104a-m are gluten free comestibles, the comestibles 104a-m can be formed using a sheeter that cuts the comestibles 104a-m from a sheet of dough.

After the multi-conveyor transfer subsystem 102 places the comestibles 104h-m on the lower conveyor 106, e.g., similar to the description below with reference to FIG. 1C, conveyors 102a-f in the multi-conveyor transfer subsystem 102 can be positioned in an upper comestible transfer position shown in FIG. 1A. While in the upper comestible transfer position, the conveyors 102a-e can receive comestibles and transfer the comestibles to a subsequent conveyor. For instance, a first conveyor 102a can transfer a comestible to the second conveyor 102b. Once the second conveyor 102b has a comestible on its upper surface and while there are not any comestibles on the third conveyor 102c, or the last conveyor 102f depending on the configuration of the system, the second conveyor 102b can transfer the comestible to the subsequent conveyor, e.g., the third conveyor 102c. Similarly, while a subsequent downstream conveyor does not have any comestibles on its upper surface, the conveyors 102a-e other than the last conveyor 102f can transfer comestibles to the subsequent conveyor.

When all of the conveyors 102a-f have comestibles on their upper surface, as shown in FIG. 1A, the conveyors 102a-f can move from the receiving position to a comestible discharge position shown in FIGS. 1B-C. For instance, the multi-conveyor transfer subsystem 102 can include one or more actuators (not shown). The actuators can couple to the conveyors 102a-f. For example, one or more actuators can couple to each of the conveyors 102a-f.

The multi-conveyor transfer subsystem 102 can use the actuators to rotate the entire or portions of the conveyors 102a-f. For instance, the first conveyor 102a can include a fixed portion and a moveable portion. In some examples, the first conveyor 102a might only include the moveable portion.

The fixed portion can be coupled to a support frame (not shown) that couples to the lower conveyor 106 and the press 108. The lower conveyor 106 can couple to the support frame using one or more additional actuators that rotate the lower conveyor. The press 108 can couple to the support frame using one or more additional components that adapted to enable movement of the press 108 up and down. The fixed portion of the first conveyor 102a can be fixed in that it does not move vertically, horizontally, or both, but allows the first conveyor 102a to rotate around one or more actuators included in the fixed portion and move comestibles in the longitudinal direction.

The first conveyor 102a can include a moveable portion. The moveable portion is different from the fixed portion in that the moveable portion is adapted to not only allow movement of the conveyor in the longitudinal direction, but also couples to one or more actuators that rotate the moveable portion around a latitudinal axis. Rotation of the moveable portion around the latitudinal axis moves the downstream end of the moveable portion downward from the receiving position to the comestible discharge position. In some examples, rotation of the moveable portion around the latitudinal axis can maintain the upstream end of the moveable portion at substantially the same position vertically.

While the first conveyor 102a moves from the receiving positon to the comestible discharge position, the first conveyor 102a can continue to actuate a conveyor belt included in the first conveyor 102a. As a result, when the first conveyor 102a moves to the comestible discharge position, the first conveyor 102a can also move any comestibles on the first conveyor 102a, e.g., the comestible 104b, in the downstream longitudinal direction. This can cause the comestibles to move both in a downward vertical direction and downstream horizontal direction.

The first conveyor 102a can couple with two or more actuators to enable the downward and the downstream comestible movement. For instance, the first conveyor 102a can couple with one or more conveying actuators that rotate a conveyor belt included in the first conveyor 102a. The first conveyor 102a can couple with one or more translational actuators that move the first conveyor 102a from the receiving position to the comestible discharge position.

The conveyors 102a-f can use any appropriate component to convey comestibles. For example, the conveyors 102a-f can include conveyor belts, rollers, or a combination of both.

Similar to the moveable portion of the first conveyor 102a, the subsequent conveyors 102b-f can couple to one or more actuators to move comestibles in both a downstream and downward direction. For instance, the last conveyor 102f can include conveying actuators that rotate a conveyor belt included in the last conveyor 102f. The last conveyor 102f can couple with one or more translational actuators that move the last conveyor 102f from the receiving position to the comestible discharge position.

While the conveyors 102a-f move from the receiving positions to the comestible discharge positions, the press 108 can press one or more comestibles. For instance, the press 108 can press a pattern of comestibles that includes the comestibles 104h-m shown in FIG. 1A but not shown in FIG. 1B since the comestibles 104h-m are being flattened. In some examples, the comestibles 104h-m can have a hockey puck like shape before being processed by the press 108.

The conveyors 102a-f in the multi-conveyor transfer subsystem 102 can move from the receiving positions to the comestible discharge positions at substantially the same time. For instance, a controller included in the comestible processing system 100 can send a signal to the one or more actuators to cause the one or more actuators to move downstream ends of the conveyors 102a-f in the downward direction at substantially the same time.

The controller can send the signal in response to any appropriate trigger. For instance, the system can include a sensor, e.g., a camera or a motion sensor, that detects the comestible 104g on the last conveyor 102f. Upon detecting the comestible 104g on the last conveyor 102f, the controller can send the signal to the one or more actuators to cause the one or more actuators to move the downstream ends of the conveyors 102a-f in the downward direction at substantially the same time. In some examples, the controller uses a timer. When the controller determines that the timer has expired, the controller can send the signal to the one or more actuators.

As shown in FIG. 1C, the conveyors 102a-f can transfer the comestibles 104b-g onto the lower conveyor 106. As part of the transfer process, the conveyors 102a-f can position the comestibles 104b-g at approximately the geometric centers for the pressing pattern at which the press 108 will operate. For instance, when the press includes a location for each comestible in the pattern, the conveyors 102a-f can position the comestibles at approximately the geometric centers for the locations on the lower conveyor 106 such that the comestibles 104b-g will be at approximately the geometric centers when positioned in the press 108.

In some examples, the press 108 includes one or more components for each of the locations in the pattern. For instance, the press 108 can include spacer locations in the press 108 each of which aligns with one of the locations in the pattern. The spacers can be any appropriate type of component adapted to increase an evenness of a bottom surface of the press 108, a uniformity of comestible thickness after the comestibles 104b-g are pressed, or both. The spacers can be approximately the same size as, e.g., slightly smaller than, a target size for pressed comestibles 110h-m. By positioning the comestibles 104b-g at approximately the geometric centers for the pressing pattern, the multi-conveyor transfer subsystem 102 can increase a likelihood that the comestibles 104b-g will approximately align with corresponding components from the press 108, e.g., with spacer locations.

In some implementations, to increase a likelihood that the comestibles 104b-g approximately align with corresponding geometric centers from the pressing pattern, the multi-conveyor transfer subsystem 102 can use different speeds for the various conveyors 102a-f. For instance, if one or more comestibles positioned on the last conveyor 102f might not align with the corresponding geometric centers from the pressing pattern, the multi-conveyor transfer subsystem 102 can adjust a speed of the last conveyor 102f to increase a likelihood that the one or more comestibles, e.g., the comestible 104g, will align with corresponding geometric centers from the pressing pattern. The speed adjustment can be an increased speed or a decreased speed.

While the multi-conveyor transfer subsystem 102 transfers the comestibles 104b-g onto the lower conveyor 106, the press 108 can finish a pressing process of the comestibles 104h-m. For example, the press 108 can move upward, away from the lower conveyor 106 after forming corresponding pressed comestibles 110h-m. The pressed comestibles 110h-m have larger diameters, and smaller thicknesses than the comestibles 104h-m. In some examples, the pressed comestibles 110h-m can be partially baked, e.g., par-baked.

For example, during the pressing process, the comestible processing system 100 can stop movement of the lower conveyor 106. This can enable the press 108 to process comestibles with a lower likelihood of deforming the comestibles as would occur if the lower conveyor 106 were still moving. After the press 108 finishing processing the comestibles, e.g., forming the pressed comestibles 110h-m, the lower conveyor 106 can begin moving in the longitudinal direction. This can move the pressed comestibles 110h-m to a downstream component in the comestible processing system 100, e.g., an oven.

Once the lower conveyor 106 is moving, the multi-conveyor transfer subsystem 102 can transfer the comestibles 104b-g onto the lower conveyor 106. The multi-conveyor transfer subsystem 102 does not transfer comestibles onto the lower conveyor 106 while the lower conveyor 106 is not moving because this would cause the comestibles to deform. Instead, the multi-conveyor transfer subsystem 102 transfers comestibles 104b-g onto the lower conveyor 106 while the lower conveyor is moving in the same longitudinal direction, e.g., moving comestibles to the right as shown in FIGS. 1A-C, to reduce a likelihood that the comestibles 104b-g are deformed during the transfer process.

The comestible processing system 100 can include a support frame (not shown). The support frame can couple to the various components of the comestible processing system. For instance, the support frame can couple to each of the conveyors 102a-f, the lower conveyor 106, and the press 108. The support frame can couple to the conveyors 102a-f and the lower conveyor 106 by coupling to corresponding actuators that couple to the respective conveyors. The support frame can couple with a press frame that includes one or more actuators that move the press 108. For instance, the press actuators can move the press 108 upward while a downward force, e.g., gravity, moves the press 108 downward.

The controller can include several different functional components, including a timer module and a trigger detection module. The timer module, the trigger detection module, or a combination of these, can include one or more data processing apparatuses, can be implemented in code, or a combination of both. For instance, each of the timer module and the trigger detection module can include one or more data processors and instructions that cause the one or more data processors to perform the operations discussed herein.

The various functional components of the comestible processing system 100 can be installed on one or more computers as separate functional components or as different modules of a same functional component. For example, the controller can be implemented as a computer program installed on one or more computers in one or more locations that are coupled to each through a network. In cloud-based systems for example, these components can be implemented by individual computing nodes of a distributed computing system.

Figure 2:
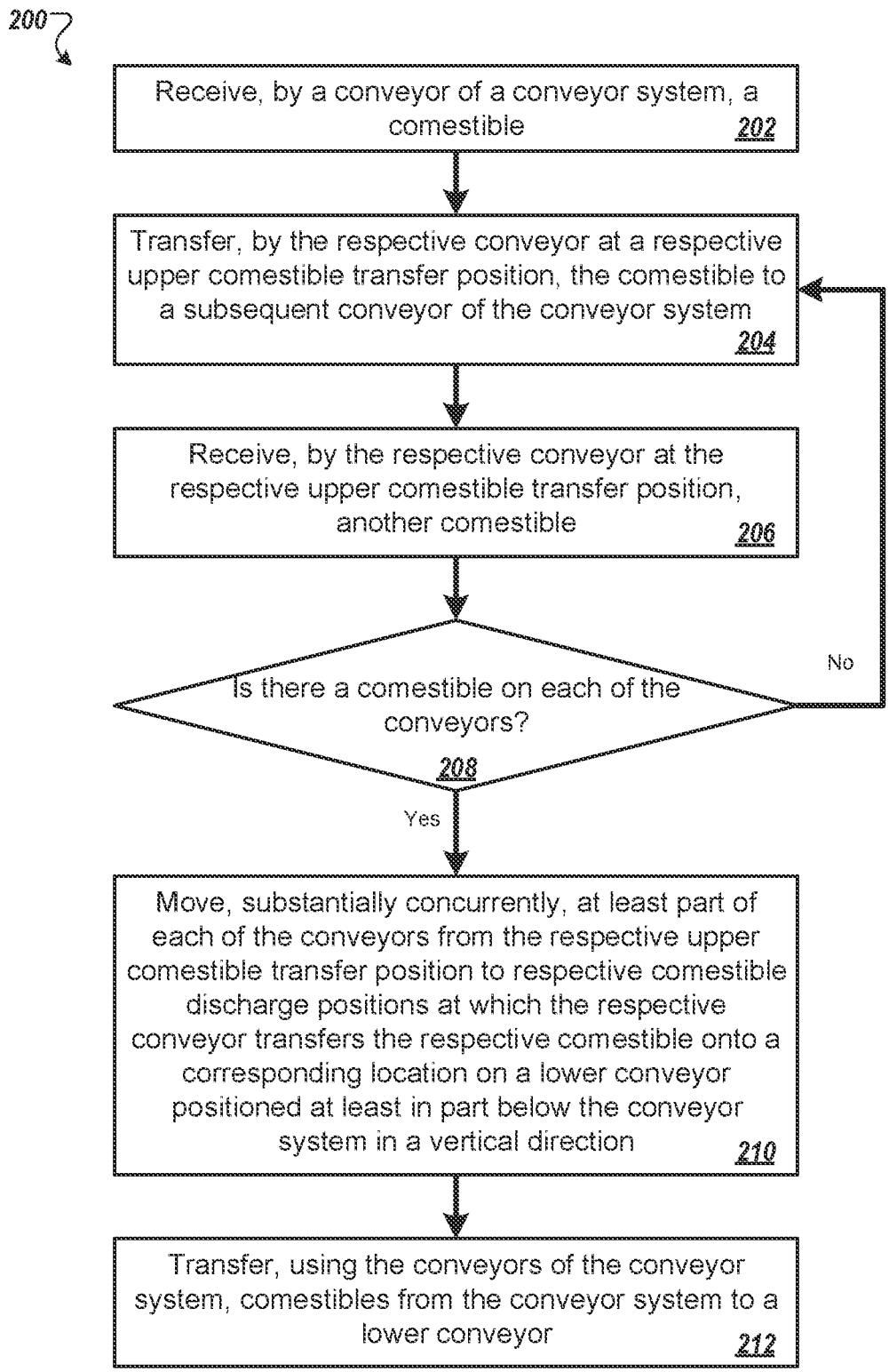
FIG. 2 is a flow diagram of an example process for transferring comestibles from a conveyor system to a lower conveyor.

FIG. 2 is a flow diagram of an example process 200 for transferring comestibles from a conveyor system to a lower conveyor. For example, the process 200 can be used by the multi-conveyor transfer subsystem from the comestible processing system 100.

A conveyor of a conveyor system receives a comestible (202). For instance, the first conveyor in the conveyor system receives the comestible. The conveyor can be at an upper comestible transfer position.

A conveyor at a respective upper comestible transfer position transfers a comestible to a subsequent conveyor of the conveyor system (204). For example, when the conveyor system does not include a comestible on each conveyor in the conveyor system, the first conveyor transfers a first comestible to the second conveyor, the second conveyor transfers a second comestible to the third conveyor, and so on. The conveyor system does not include the lower conveyor onto which the conveyor system transfers the comestibles and that is located below the conveyor system as shown in FIGS. 1A-C.

The respective conveyor at the respective upper comestible transfer position receives another comestible (206). For instance, the first conveyor receives another comestible, e.g., from an upstream component such as another conveyor. The second conveyor receives the first comestible from the first conveyor, the third conveyor receives the second comestible from the second conveyor, and so on.

The comestible system, e.g., a controller included in the comestible system, determines whether there is there a comestible on each of the conveyors (208). The comestible system can use any appropriate process to determine whether there is a comestible on each of the conveyors. For example, in some implementations, if a determination is made that there are no comestibles on a conveyor or the comestibles are deformed in some manner, the system, including the controller, can retract an input belt coming to the press in order to allow for the discarding of a portion of the comestibles to a lower catch or receptacle. The discarded portion of the comestibles, in some implementations, could then be returned via conveyors to a supply hopper of the original feeder, which can assist in the reduction or elimination of waste of raw materials.

The conveyor system moves, substantially concurrently, at least part of each of the conveyors from the respective upper comestible transfer positions to respective comestible discharge positions at which the respective conveyor transfers the respective comestible onto a corresponding location on a lower conveyor positioned at least in part below the conveyor system in a vertical direction (210). For instance, the conveyor system can include one or more actuators that couple with the conveyors included in the conveyor system. The conveyor system can send a signal, e.g., using the controller, to the one or more actuators to cause the actuators to move at least part of each of the conveyors to the respective comestible discharge positions.

The comestible system transfers, using the conveyors of the conveyor system, comestibles from the conveyor system to a lower conveyor (212). For instance, conveyor belts included in the conveyors, e.g., in each of the conveyors, can rotate, causing the conveyor system to transfer the comestibles to the lower conveyor.

In some implementations, the process 200 can include additional steps, fewer steps, or some of the steps can be divided into multiple steps. For example, the process 200 can include steps 206, 208, and 210 without steps 202, 204, or 212. In some examples, the process 200 can include steps 202 through 210 without any other steps. In some examples, the process 200 can include steps 204 through 210 without any other steps. In some examples, the process 200 can include steps 204 through 210 without any other steps. In some examples, the process 200 can include steps 204 through 212 without any other steps.

A number of implementations have been described. Nevertheless, it will be understood that various modifications may be made without departing from the spirit and scope of the disclosure. For example, various forms of the flows shown above may be used, with steps re-ordered, added, or removed.

Figure 3:
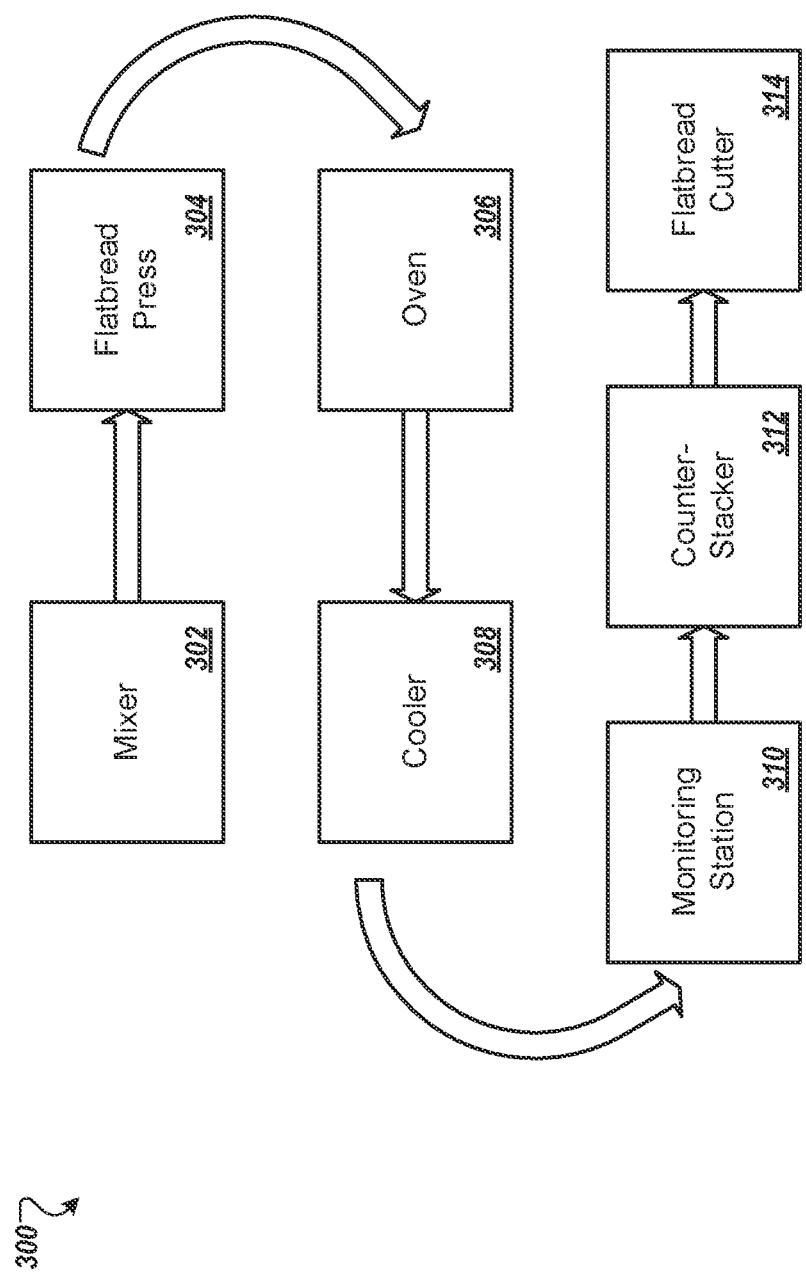
FIG. 3 depicts an example of some devices that can be included in a flatbread processing system.

FIG. 3 depicts an example of some devices that can be included in a flatbread processing system 300. The flatbread processing system 300 can be used to process the comestibles described above with reference to FIGS. 1-2. The flatbread processing system 300 does not depict all devices that could be included in a system, depending on system configuration, such as a dough loader that forms pieces of dough from batter created by a mixer 302 and places the dough pieces on the flatbread press 304, e.g., a forming press, using a comestible loader.

The flatbread processing system 300 includes a mixer 302. The mixer 302 combines multiple ingredients according to a process recipe. The mixer 302 mixes the multiple ingredients to create a dough batter.

The mixer 302 can be connected to a former (not shown) that creates dough pieces, such as dough pucks from the batter created by the mixer 302. The former can place the dough pucks in a dough puck loader that is configured according to a pressing pattern layout for the flatbread being made by the flatbread processing system 300. The former selects an amount of batter based on a threshold comestible size range for the dough pucks, e.g., to create 10 inch wraps or 8 inch wraps. The threshold comestible size range can be a comestible parameter, e.g., specified by the process recipe.

The dough loader can place the dough pucks on a conveyer included in the flatbread press 304. Once a dough puck is placed on a location on an upper surface of the conveyor for each of the locations in a pressing pattern layout, e.g., a 3×3 pressing pattern layout, the flatbread press 304 moves the conveyor forward to place the dough pucks under the press. The flatbread press 304 then presses the dough pucks. During the pressing operation, the flatbread press 304 can slightly bake the dough pucks to increase a likelihood that the pressed dough wraps will maintain their pressed shape.

The flatbread press 304 can then transfer the pressed dough wraps to a discharge station included in the flatbread press 304. The discharge station can include a heater to parbake the pressed dough wraps. Use of the discharge station can enable the flatbread press 304 to use a lower temperature during the pressing process.

The flatbread processing system 300 then transfers the pressed dough wraps from the flatbread press 304 to an oven 306. The flatbread processing system 300 can use one or more conveyors to transfer the dough wraps from the flatbread press 304 to the oven 306.

The oven 306 includes one or more oven conveyors that transfer the pressed dough wraps through the oven 306 during a cooking process. As the one or more conveyors transfer the pressed dough wraps through the oven 306, the pressed dough wraps are cooked so that when the pressed dough wraps exit the oven 306, the cooking process is likely complete. In some implementations, the pressed dough wraps can proceed to another cooking process after removal from the oven 306.

After cooking, the flatbread processing system 300 can transfer the cooked, pressed dough wraps onto one or more conveyors to transfer the pressed dough wraps from the oven 306 to a cooler 308. In some implementations, the flatbread processing system 300 can use one or more conveyors that transfer the pressed dough wraps to an upper portion of the cooler 308.

The cooler 308 can include multiple cooling conveyors that transport the pressed dough wraps through the cooler 308. The cooler 308 can use any appropriate process, components, or both, to reduce the temperature of the pressed dough wraps. For instance, as the pressed dough wraps move through the cooler 308, air can move across the surfaces of the pressed dough wraps to cool the pressed dough wraps to a reduced temperature.

In some examples, the pressed dough wraps can have a temperature close to 200° F. when entering the cooler 308. The cooler can include one or more fans to move air from an environment outside of the cooler 308 (e.g., at an ambient temperature between about 65 to about 80° F.) across the cooling conveyors and the pressed dough wraps. As the air passes across the pressed dough wraps, heat is removed from the pressed dough wraps and the pressed dough wraps are cooled.

The flatbread processing system 300 transfers the pressed dough wraps from the cooler to a monitoring station 310. The monitoring station 310 can analyze one or more properties of the pressed dough wraps, including the diameter and color. For instance, the monitoring station 310 can determine whether a pressed dough wrap was burnt, conforms with size requirements for a process recipe for the pressing pattern, or both. In general, the monitoring station 310 can determine whether the pressed dough wrap substantially conforms with one or more threshold comestible parameters for the process recipe.

The monitoring station 310 can include a dough wrap removal device used to remove dough wraps from the monitoring station 310 that do not conform to predetermined criteria for the recipe. For instance, the monitoring station can include one or more air blowers, e.g., one for each processing lane for the pressing pattern, to remove pressed dough wraps that were overcooked, pressed too much, not pressed enough, or a combination of these.

The flatbread processing system 300 transfers the pressed dough wraps that conform to the predetermine criteria to a counter-stacker 312. The counter-stacker 312 can create stacks of pressed dough wraps based on a stack quantity identified in the recipe for the flatbread processing system 300.

The flatbread processing system 300 transfers stacks of pressed dough wraps to a bagger 314 that places each stack into a bag. The bagged stack of pressed dough wraps can then be removed from the bagger 314 and the flatbread processing system 300.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:
1. A system comprising:
   a conveyor subsystem i) adapted to move a plurality of comestibles in a longitudinal direction and onto a lower conveyor positioned at least in part below the conveyor subsystem in a vertical direction and ii) comprising:

a first conveyor adapted to move from a) a first upper comestible transfer position at which the first conveyor receives comestibles and transfers at least some of the comestibles to a subsequent conveyor to b) a first comestible discharge position at which the first conveyor places at least some of the comestibles onto a first location on the lower conveyor; and a last conveyor spaced apart longitudinally from the first conveyor and adapted to move from (a) a last upper comestible transfer position at which the last conveyor receives second comestibles to (b) a last comestible discharge position at which the last conveyor places the second comestibles onto a last location on the lower conveyor that is separated from the first location in the longitudinal direction.

2. The system of claim 1, wherein:
the first conveyor is adapted to move from the first upper comestible transfer position to the first comestible discharge position when a first comestible approaches a first downstream edge of the first conveyor; and
the last conveyor is adapted to move from the last upper comestible transfer position to the last comestible discharge position when a last comestible approaches a last downstream edge of the last conveyor.

3. The system of claim 1, wherein, for the first conveyor, the first comestible discharge position is a position at which the first conveyor places at least some of the comestibles onto the first location on the lower conveyor and does not transfer any comestibles to the subsequent conveyor.

4. The system of claim 1, wherein the conveyor subsystem comprises two or more actuators each of which is coupled to a corresponding conveyor and adapted to move at least a portion of the corresponding conveyor from a upper comestible transfer position to a comestible discharge position.

5. The system of claim 4, wherein a last actuator from the two or more actuators is adapted to rotate the entire last conveyor from the last upper comestible transfer position to the last comestible discharge position.

6. The system of claim 4, wherein:
the two or more actuators comprise a first actuator coupled to the first conveyor and two or more second actuators coupled to respective conveyors, the respective conveyors including the subsequent conveyor and the last conveyor; and
each of the two or more second actuators is adapted to rotate, substantially concurrently, the respective conveyor from a respective receiving position to a respective discharge position.

7. The system of claim 6, wherein the first actuator is adapted to rotate a moveable portion of the first conveyor substantially concurrently with the rotation of the respective conveyors by the corresponding ones of the two or more second actuators.

8. The system of claim 6, comprising the subsequent conveyor (i) separate from the last conveyor and (ii) that has substantially the same shape as the last conveyor.

9. The system of claim 1, wherein the first conveyor comprises:
a substantially fixed portion adapted to receive a comestible from a prior transfer device; and
a moveable portion downstream longitudinally from the substantially fixed portion adapted to rotate and place a comestible onto the lower conveyor.

10. The system of claim 9, wherein the substantially fixed portion is substantially horizontal.

11. The system of claim 1, comprising the lower conveyor adapted to receive comestibles separated longitudinally from the first conveyor and the last conveyor.

12. The system of claim 11, comprising a support frame that couples to the conveyor subsystem and the lower conveyor.

13. The system of claim 12, comprising a press (i) coupled to the support frame, (ii) downstream longitudinally from the conveyor subsystem, and (iii) that is adapted to press comestibles positioned on the lower conveyor after the conveyor subsystem moves the comestibles onto the lower conveyor.

14. A method comprising:
receiving, by a first conveyor of a conveyor system, a first comestible;
transferring, by the first conveyor at a respective upper comestible transfer position, the first comestible to a subsequent conveyor of the conveyor system;
receiving, by the first conveyor at the respective upper comestible transfer position, a second comestible;
receiving, by a last conveyor of the conveyor system at a respective upper comestible transfer position, a third comestible; and
moving, substantially concurrently, at least part of the first conveyor and at least part of the last conveyor from the respective upper comestible transfer positions to respective comestible discharge positions at which the respective conveyor transfers the respective comestible onto a corresponding location on a lower conveyor positioned at least in part below the conveyor system in a vertical direction.

15. The method of claim 14, wherein moving the first conveyor and the last conveyor comprises rotating, using one or more actuators, the first conveyor and the last conveyor from the respective upper comestible transfer positions to the respective comestible discharge positions.

16. The method of claim 14, comprising:
determining, for each discharging conveyor in the conveyor system, whether the respective discharging conveyor has at least one comestible on an upper surface, wherein the discharging conveyors comprise at least the first conveyor and the last conveyor; and
in response to determining that at least one discharging conveyor in the conveyor system does not have at least one comestible on an upper surface, transferring, by one or more of the discharging conveyors, comestibles to subsequent discharging conveyors.

17. The method of claim 16, wherein determining whether the respective discharging conveyor has at least one comestible on an upper surface uses a sensor.

18. The method of claim 14, wherein moving at least part of the first conveyor and at least part of the last conveyor comprises:
determining, for each discharging conveyor in the conveyor system, whether the respective discharging conveyor has at least one comestible on an upper surface, wherein the discharging conveyors comprise at least the first conveyor and the last conveyor; and
in response to determining that each of the discharging conveyors in the conveyor system have at least one comestible on an upper surface, moving, substantially concurrently, at least part of each of the discharging conveyors from a respective upper comestible transfer position to a respective comestible discharge position at which the respective discharging conveyor places a respective comestible onto a corresponding location on the lower conveyor.

19. The method of claim 18, wherein determining whether the respective discharging conveyor has at least one comestible on an upper surface comprises determining whether a time period has expired.

20. The method of claim 14, comprising:
moving, by the lower conveyor, one or more comestibles received from the conveyor system to corresponding locations in a press; and
pressing, by the press, the one or more comestibles to form one or more corresponding flattened comestibles.

21. The method of claim 20, comprising:
maintaining the lower conveyor in a stopped position while the press presses the one or more comestibles to form the one or more flattened comestibles;
moving the lower conveyor to move the flattened comestibles downstream from the press; and
substantially concurrently with moving the lower conveyor to move the flattened comestibles downstream from the press, transferring, using at least the first conveyor and the last conveyor in respective comestible discharge positions, the second comestible and the third comestible to the lower conveyor.

\* \* \* \* \*

UNITED STATES PATENT AND TRADEMARK OFFICE
CERTIFICATE OF CORRECTION

PATENT NO. : 12,178,213 B2  
APPLICATION NO. : 18/082816  
DATED : December 31, 2024  
INVENTOR(S) : Eric Clay Lawrence Page 1 of 1

It is certified that error appears in the above-identified patent and that said Letters Patent is hereby corrected as shown below:

On the Title Page

Item (72) Inventor, Column 1, Line 1, delete "Hungtington" and insert --Huntington--.

Signed and Sealed this
Twenty-fifth Day of February, 2025

Coke Morgan Stewart
*Acting Director of the United States Patent and Trademark Office*